Jan. 29, 1929. Re. 17,201

O. F. JENSEN

RAILWAY HIGHWAY CROSSING

Original Filed May 23, 1925 2 Sheets-Sheet 1

Inventor
Olaf F. Jensen
By attorney
Paul Carpenter

Jan. 29, 1929. Re. 17,201
O. F. JENSEN
RAILWAY HIGHWAY CROSSING
Original Filed May 23, 1925 2 Sheets-Sheet 2
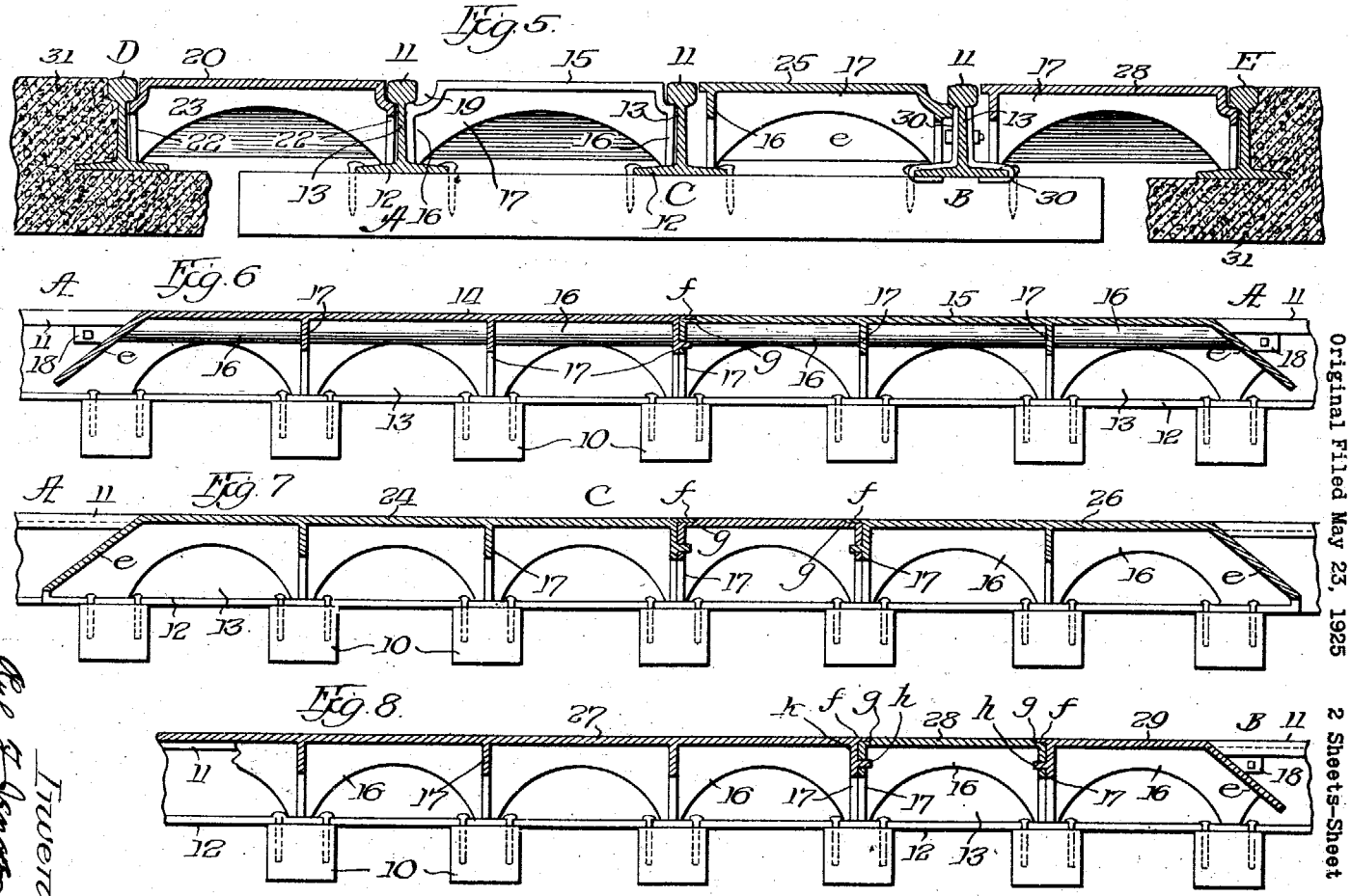
Inventor:
Olof F. Jensen
By Attorney
Rine Carpenter Reissued Jan. 29, 1929. Re. 17,201

UNITED STATES PATENT OFFICE.

OLUF F. JENSEN, OF COUNCIL BLUFFS, IOWA, ASSIGNOR, BY MESNE ASSIGNMENTS, TO LOCOMOTIVE FINISHED MATERIAL COMPANY, OF ATCHISON, KANSAS, A CORPORATION OF KANSAS.

RAILWAY HIGHWAY CROSSING.

Original No. 1,557,590, dated October 20, 1925, Serial No. 32,321, filed May 23, 1925. Application for reissue filed August 1, 1927. Serial No. 209,955.

This invention relates to highway crossings over railway tracks, and has for its object to provide slidable and rotatable plates which may be used in connection with the railway ties and track rails, said plates being of such proportion that they may be prepared in stock ready for use and may be conveniently mounted between the track rails to provide a complete, permanent crossing at a less expense of time than ordinary.

The invention broadly includes the use of comparatively thin bearing-plates having flanges or wings projecting downwardly from their longitudinal edges to be disposed between the balls and bases and to be supported on the bases of two adjacent rails, the plates when thus mounted having their wings disposed closely adjacent to the webs of the rails and having their upper surfaces disposed in line with the upper surfaces of the balls of said rails so that vibration usually caused by moving vehicles on crossings may be practically eliminated.

The invention also includes a third rail disposed midway between and approximately parallel with the track rails so that the plates may have a lesser width to permit them to be constructed of thin material, said plates, on account of the construction provided, being adapted to adequately sustain all stresses incident to travel, the third rail having a suitable length and preferably corresponding to the form, in cross section, of the track rails. Also the invention includes reinforcing ribs for the plates, said ribs being arranged for a support upon the bases of the track rails.

While the invention includes structural parts providing a permanent crossing as a feature of durability, these parts, or so many as is necessary, may be readily removed to permit removal of a broken track rail or for repairs of a rail joint, and the plates provide housings for the rail joints and their usual attachments.

With the foregoing objects in view and others to be mentioned the invention presents a novel and useful construction, combination and arrangements of parts as described herein and claimed and as illustrated in the accompanying drawings, it being understood that changes in form, size, proportion of parts and minor details may be made as found to be of advantage, said changes being within the scope of the invention as claimed.

In the drawing, Figure 1 is a plan view of a railroad highway crossing showing one embodiment of the invention;

Figure 3 is a side view of a bearing plate showing a groove for receiving the flange of a car wheel;

Figure 4 is a view showing the opposite side of said plate;

Figure 5 is a sectional view on line 5—5 of Figure 1;

Figure 6 is a sectional view on line 6—6 of Figure 1;

Figure 7 is a longitudinal section on line 7—7 of Figure 1, and

Figure 8 is a sectional view on line 8—8 of Figure 1;

Figure 1:
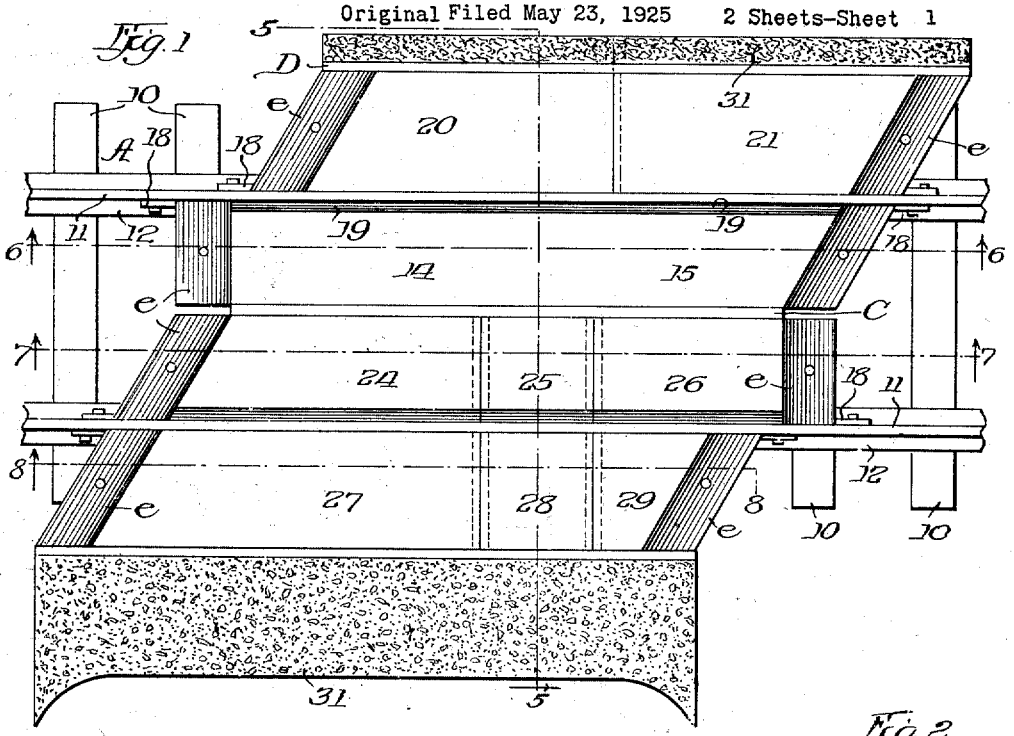

Referring now to the drawing for a more particular description, the invention is shown and described in connection with the railway ties 10 and the parallel track rails A and B thereon, the ball of each track rail being indicated at 11, its base being indicated at 12 and its web being indicated at 13.

For purposes of the invention I provide a third rail C of substantially the length corresponding to the width of the highway adapted to be disposed approximately parallel with and midway between the track rails A and B. Numerals 14 and 15 indicate bearing plates disposed between the rail C and track rail A, each plate having wings or flanges 16 projecting downwardly from its longitudinal edges and having its lower side provided with ribs 17, each rib being disposed transversely of a plate. While I have shown only two of these plates, any desired number may be employed, depending upon the width of a crossing, and said plates may have sliding movements on the bases of the rails A and C when building a crossing or when it might be necessary to remove a broken track rail; and blocks 18 may be secured to the rail at the ends of the plates to prevent creeping. These plates are provided with grooves 19 for receiving the flanges of car wheels.

I provide additional rails D and E, these being disposed outwardly of and approximately parallel with the respective rails A and B. While said rails D and E are shown to be similar to ordinary track rails, this feature is not important, and inverted T-rails may be used for this purpose if desired.

Numerals 20 and 21 indicate bearing plates adapted to have sliding movements for their mounting between rails A and D shown best in Figure 5 of the drawings, their wings 22 being supported on the bases of said rails, said plates being provided, transversely, with reinforcing ribs 23 similar to those described.

Numerals 24, 25 and 26 indicate bearing plates disposed between the rails B and C, and they are provided at their longitudinal edges with wings 16 and ribs 17 for a support on the bases of said rails B and C, the same as described.

Numerals 27, 28 and 29 indicate bearing plates disposed between the rails B and E, each being provided with wings 16 and ribs 17 engaging the bases 12 of said rails.

As indicated at *e*, the ends of the plates at the respective sides of the crossing are inclined downwardly, this being the preferred construction to provide closures, and being of advantage to avoid injury which might occur from loose parts occasionally carried by moving trains, and to prevent accumulations beneath the crossing of sand, dust or snow.

It will be appreciated that the movable feature for the plates operates to advantage since it might be necessary to remove a damaged rail or to repair a rail joint, the fishplates for the latter being indicated at 30.

The plates 20 and 21 may have outward sliding movements for their removal after the blocks 18 have been detached from the rail A. Also, after detaching the blocks 18 the plates 14, 15, 24, 26, 27 and 29 may be removed by causing them to slide outwardly.

The plates 25 and 28, which cover the rail joint, may have rocking movements to effect their removal, it only being necessary to move the plates 24, 26, 27 and 29 a limited distance.

In order that sand, dust or other similar substances will not move downwardly between the ends of the plates, suitable flanges *f* and recesses *g* are provided for their abutting ends, said flanges being adapted to engage in the recesses when the parts are assembled as a complete crossing. Also other cooperating fastening devices are provided, as for instance, projections *h* adapted to enter apertures *k* which are provided for the abutting ends of the plates. While, as shown in the drawing, these last named fastening devices are provided for the ribs of two adjacent plates, they may be provided for other parts of the plates; also the projections *h* may be of any suitable proportions, the recesses having such proportions that they will receive said projections, the object in view being to prevent undue vibration of the plates when subjected to stresses directed thereto.

The crossing as described may have any required width, and while it is shown as a crossing for a single track it, of course, may have a length sufficient to cross any required number of tracks. Numerals 31 indicate approaches to the crossing which may be constructed of any suitable material.

Figure 2:
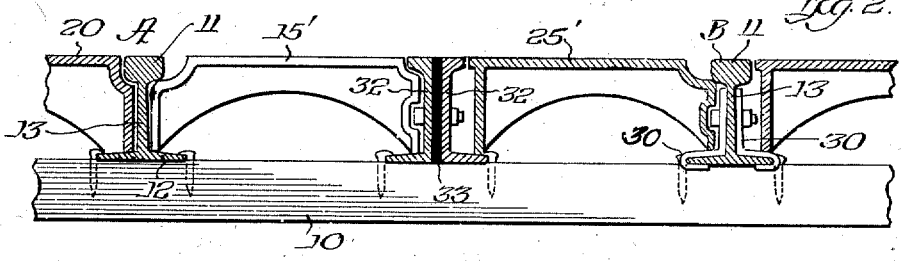
Figure 2 is a sectional detail showing insulation between the plates, for use in connection with a block signal system.
Figure 3:
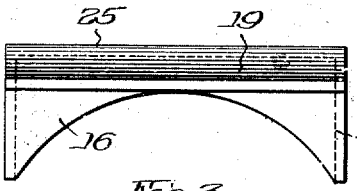
Figures 3 and 4 are details relating to Figure 5.
Figure 4:
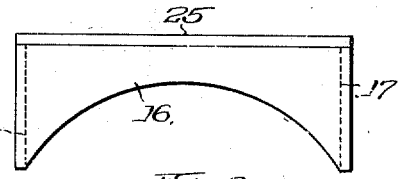

In Figure 2 a pair of horizontal beams 32 are shown as a substitute for the rail C, and between these beams is disposed an insulating plate 33 adapted for use in instances where a railway is operating under a block signal system, it being assumed that the plates 15′ and 25′ are of metallic construction and therefore would operate as electrical conductors between the rails A and B.

While the rail C is of advantage in the construction of the herein described crossing, it could be dispensed with if plates of considerable thickness were used, and therefore I do not wish to be limited to the use of said rail.

Figure 9:
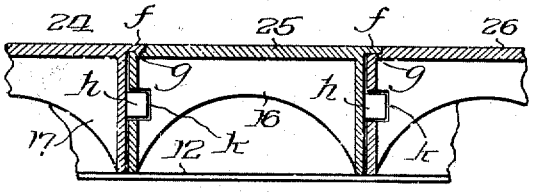
Figure 9 is a sectional view showing a modified arrangement for connecting the plates.

Figure 9 illustrates a modified form of the invention since the wings 16 of the bearing plate 25 are provided at one of their ends with recesses *g* and *k*, the wings at its opposite end being provided with projections *f* and *h*. This construction is clearly within the scope of the invention and it permits the projections *f* and *h* of the bearing plate 24 to enter recesses *g* and *k* of the bearing plate 26 after the plate 25 has been removed, this feature being an advantage in manufacturing or production to permit interchange of the plates.

While I have shown and described a rail C between two track rails and identified it as a "third rail", it is obvious that the scope of the invention permits more than a single rail C to be employed, and I do not wish to limit myself to the employment of a single rail C.

I claim as my invention—

1. A highway crossing for the rails of railway tracks comprising bearing plates disposed end to end between said rails in engagement with the bases and with their upper surfaces approximately in alignment with the upper surfaces of said rails, said bearing plates being provided with terminal recesses and projections and adapted to have sliding movements on said bases, the terminal projections of one bearing plate entering the terminal recesses of an adjacent bearing plate.

2. In a highway crossing for the pair of rails of a railway track, a third rail having a form in cross section corresponding to and adapted to be disposed between the rails of said track, and bearing plates each having wings projecting downwardly from its longitudinal edges for engaging the base of a track rail and the base of the third rail.

3. In a highway crossing for the pair of rails of a railway track, a third rail having a base and adapted to be disposed between the rails of said track, a plurality of bearing plates each having downwardly projecting wings and adapted to have sliding movements on the base of a track rail and base of the third rail, and means to prevent sliding movements of the bearing plates.

4. In a highway crossing for the pair of rails of a railway track, a third rail having a form in cross section corresponding approximately to and adapted to be disposed midway between the rails of said track, bearing plates each having downwardly projecting wings at its longitudinal edges and having ribs disposed transversely of and connected with its wings, said plates being adapted to be disposed between with their wings seated on the bases of the third rail and rails of said track.

5. In a highway crossing for the pair of rails of a railway track, a third intermediate rail of a length corresponding to the width of the highway having a form in cross section corresponding approximately to and adapted to be disposed between the rails of said track, bearing plates adapted to be slidably disposed on the bases with their upper surfaces in line with the upper surfaces of the third rail and rails of the track, and means to prevent sliding movements of the bearing plates relative to the rails of said track.

6. In a highway crossing for the pair of rails of a railway track, a third intermediate rail of a length corresponding to the width of the highway having a base and adapted to be disposed between the rails of said track, bearing plates each disposed between and mounted to permit sliding movements on the bases of the third rail and track rails to permit removal of said plates from the crossing, one of said bearing plates being adapted to have a swinging movement transversely of the rails to permit removal of said plates from said crossing.

7. In a highway crossing for the rails of a railway track, a third rail having a base and disposed between the track rails, bearing plates disposed end to end between the third rail and track rails in engagement with the bases and with their upper surfaces in alignment with the upper surfaces of the track rails and third rail, said bearing plates being provided with terminal recesses and projections and adapted to have sliding movements on said bases, the terminal projection of one bearing plate entering the terminal recess of an adjacent bearing plate.

8. In a railway crossing, a track including cross ties and main track rails, an intermediate rail of length substantially equivalent to the width of the highway between the track rails, a set of plates between each rail and the intermediate rail, each plate comprising a flat body portion having stiffening flanges and engaging and supporting flanges at its ends resting on the base flanges of the main rails and intermediate rail.

9. In a railway crossing, a track including cross ties and main track rails, an intermediate rail of length substantially equivalent to the width of the highway between the track rails, a set of plates between each rail and the intermediate rail, each plate comprising a flat body portion having stiffening flanges and engaging and supporting flanges at its ends resting on the base flanges of the main rails and intermediate rail.

10. In a railway crossing, a series of cross ties, a pair of main rails, an intermediate rail of length substantially equivalent to the width of the highway, a set of plates between each of the main rails and the intermediate rail, each plate comprising a flat body portion including engaging flanges at its ends resting on the flanges of the main rails and intermediate rail.

11. In a railway crossing a series of cross ties, a pair of main rails, an intermediate rail of length substantially equivalent to the width of the highway, a set of plates between each of the main rails and the intermediate rail, each plate comprising a flat body portion including engaging flanges at its ends resting on the flanges of the main rails and intermediate rail and inclined guard plates at the edge of the crossing.

12. In a railway crossing, a series of cross ties, main track rails, an intermediate rail of length substantially equivalent to the width of the highway, a set of plates between each main rail and the intermediate rail, each plate comprising a flat body portion having a stiffening flange and engaging and supporting flanges at its ends resting on the base flanges of the main rails and intermediate rail whereby the plates may be inserted between the rails and moved into position, and means for securing the plates to the rails.

13. A plate for railway crossings comprising a surface portion and a depending flange at one end thereof of the configuration constructed and arranged to engage a rail between the base flange and ball thereof against vertical displacement in either direction by the flange and ball respectively and means adapted to prevent lateral displacement.

14. A plate for railway crossings comprising a surface portion and a depending flange at one end thereof constructed and arranged to engage a rail substantially snugly between the base flange and ball thereof against vertical displacement in either direction by the flange and ball respectively.

15. A plate for railway crossings comprising a surface portion and a depending flange at one end thereof conforming in general contour to a rail between the base flange and ball thereof whereby it may be disposed snugly between the rail head and base flange to prevent vertical displacement.

16. A plate for railway crossings comprising a surface portion and a depending flange at one end thereof conforming in general contour to a rail between the base flange and ball thereof and including a railway wheel clearance flange whereby it may be disposed snugly between the rail head and base flange to prevent vertical displacement.

17. A plate for rail crossings comprising a substantially flat body portion having a depending flange at one end thereof, said flange being formed with a rail ball engaging portion and a rail base flange seating portion arranged to prevent vertical displacement of said plate and means adapted to prevent lateral displacement.

18. A crossing plate for railways adapted to form a continuous surface thereover, said plate having depending flanges at ends thereof formed to engage a rail between the ball and base flange portions thereof and a bracing rib longitudinally disposed arranged to support loads normally encountered in use, said rib being formed to clear the railway road bed.

19. In combination a rail of a railway road bed, a plate having a substantially flat surface adapted to form a continuous surface therewith, a rail engaging joint formed on said plate comprising a rail ball engaging portion and rail base flange engaging portion adapted to hold said plate beneath the rail ball against vertical displacement in relation to said rail.

20. In a railway crossing, a series of cross ties, a pair of side rails, an intermediate rail of length substantially equivalent to the width of the highway, a set of plates between each side rail and the intermediate rail, each comprising a flat body portion having stiffening flanges disposed longitudinally thereof and rail engaging flanges at its ends, resting on the flanges of the side and intermediate rails and wheel flange guards between said plates and said side rails.

21. In a railway crossing, a series of cross ties and main track rails, an intermediate rail of length substantially equivalent to the width of the highway, a set of plates between the main rails and intermediate rail adapted to form a substantially continuous surface thereover, each plate comprising a flat body portion and rail engaging and supporting flanges at its ends adapted to rest on the base flanges of the main rails and intermediate rails for support on said plates and insulating blocks interposed between the plates and said rails.

22. In a railway crossing, a track including cross ties, main track rails and an intermediate rail, a set of plates each comprising a flat body portion adapted to form a continuous crossing with said main track rails, said plates including end flanges of a configuration to rest upon the base flange of a rail and be held against vertical displacement by the ball of the rail and of a length less than the distance between the main track rails and the intermediate rail adapted to engage and support one end of said set of plates, said plates and intermediate rail being so associated whereby said plates may be slidably disposed with their upper surfaces in line with the upper surfaces of the intermediate rail and rails of the track.

In witness whereof I have hereunto signed my name this 30 day of June, 1927.

OLUF F. JENSEN.